No. 673,656. Patented May 7, 1901.
H. KRANTZ.
BUSHING FOR ELECTRICAL OUTLET BOXES.
(Application filed Feb. 9, 1901.)

(No Model.)

WITNESSES:
F. W. Wright.
S. C. Connor

INVENTOR
HUBERT KRANTZ
BY
Howson and Howson
HIS ATTORNEYS.

UNITED STATES PATENT OFFICE.

HUBERT KRANTZ, OF BROOKLYN, NEW YORK.

BUSHING FOR ELECTRICAL OUTLET-BOXES.

SPECIFICATION forming part of Letters Patent No. 673,656, dated May 7, 1901.

Application filed February 9, 1901. Serial No. 46,689. (No model.)

*To all whom it may concern:*

Be it known that I, HUBERT KRANTZ, a citizen of the United States of America, residing in the borough of Brooklyn, county of Kings, in the State of New York, have invented an Improved Bushing for Electrical Outlet-Boxes, of which the following is a specification.

The object of my invention is to provide a bushing for outlet-boxes for conduits for electrical conductors such that it will be simple and economical in construction and manufacture, be convenient in use, and prevent the conduit-pipe ends from projecting into the outlet-box.

Figure 1:
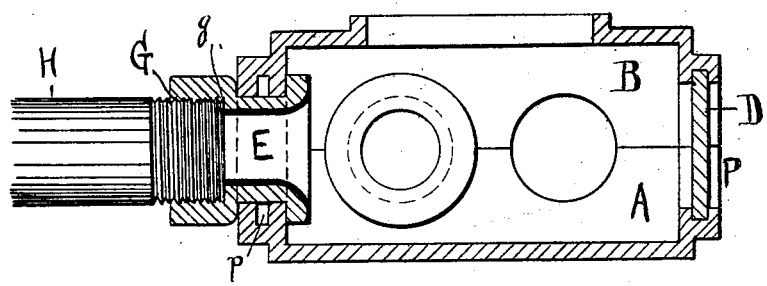
Figure 2:
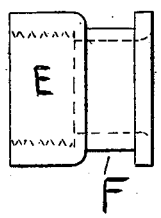

In the accompanying drawings, Figure 1 is a vertical section through an outlet-box provided with my improved bushing. Fig. 2 is a side view of my preferred construction of bushing, and Fig. 3 is a similar view of a modification.

My invention is designed for use in connection with that class of outlet-boxes which are split in two, as illustrated, for instance, in my patent, No. 609,356, dated August 16, 1898. Such a box is illustrated in Fig. 1, A being the lower half of the box and B the upper half and the two parts being provided with corresponding semicircular rims P, forming openings for the conduit-pipes or adapted to receive closing-disks D, fitted in grooves $p$ in these rims. To connect the end of a conduit-pipe with a box of this character in a convenient manner and by simple means and in such a way that the box will be effectually grounded through the pipe and yet so that the pipes and boxes will be held in firm relation without danger of the pipe ends projecting into the box, I provide the improved bushing shown in Figs. 1 and 2 and consisting of a hollow cylinder E with an external annular groove F near one end and with an internal thread G at its other end extending only part way through and terminating in the internal shoulder $g$. The external annular groove F is for the reception of the semicircular rims P of the two halves of the box, while the internal thread G is to receive the externally-threaded end of the conduit-pipe H, and the shoulder $g$ is to limit the screwing of the bushing onto the pipe and prevent the ends of the pipe being screwed through into the box, where it might lacerate the wires. The interior of the bushing between the shoulder $g$ and the end which leads into the interior of the outlet-box preferably has a coating of enamel. The bushings G are screwed up onto the ends of the conduit-pipes while the cover B of the outlet-box is off. When the cover is in place, the box and pipes are held in firm relation to each other by simple means and there is obtained good electrical connection between the box and pipes through the bushing for the grounding of the box.

Figure 3:
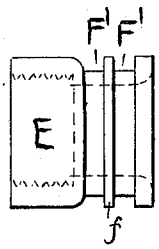

If desired, the bushing may be formed with two external annular grooves, as shown at F' in Fig. 3, thus leaving an intermediate rib $f$, which will fit into the groove $p$ in the outlet-box and so increase the contact-surfaces between the box and bushing.

I claim as my invention—

1. As a new article of manufacture, a bushing for outlet-boxes having an external annular groove and at one end an internal thread terminating in an interior shoulder, as and for the purpose described.

2. As a new article of manufacture, a bushing for outlet-boxes, having near one end an external annular groove and at the opposite end an internal thread extending only part way through the bushing, as and for the purpose described.

3. The combination of a two-part outlet-box having corresponding grooved semicircular rims with a bushing internally threaded at one end and with two external annular grooves to fit said grooved rims in the box, as and for the purpose described.

In testimony whereof I have signed my name to this specification in the presence of two subscribing witnesses.

HUBERT KRANTZ.

Witnesses:
 HERMANN RICHTER,
 HENRY STUBING.